United States Patent
Liu et al.

(10) Patent No.: US 9,066,127 B2
(45) Date of Patent: Jun. 23, 2015

(54) METHOD AND DEVICE FOR CONTROLLING BANDWIDTH OF SET TOP BOXES IN INTERNET PROTOCOL TELEVISION (IPTV) SYSTEM

(75) Inventors: Xiaojing Liu, Shenzhen (CN); Jingui Su, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 208 days.

(21) Appl. No.: 13/518,469

(22) PCT Filed: Jun. 22, 2011

(86) PCT No.: PCT/CN2011/076154
§ 371 (c)(1),
(2), (4) Date: Jun. 22, 2012

(87) PCT Pub. No.: WO2012/034430
PCT Pub. Date: Mar. 22, 2012

(65) Prior Publication Data
US 2012/0266196 A1    Oct. 18, 2012

(30) Foreign Application Priority Data

Sep. 16, 2010    (CN) .......................... 2010 1 0283083

(51) Int. Cl.
*H04N 7/10* (2006.01)
*H04N 7/025* (2006.01)
(Continued)

(52) U.S. Cl.
CPC ... *H04N 21/42209* (2013.01); *H04N 21/26216* (2013.01); *H04N 21/6373* (2013.01);
(Continued)

(58) Field of Classification Search
CPC .......... H04N 5/4403; H04N 21/42204; H04N 21/431; H04N 21/24; H04N 21/2402
USPC ................................... 725/37, 39, 40, 44–47
See application file for complete search history.

(56) References Cited

U.S. PATENT DOCUMENTS

2002/0057297 A1* 5/2002 Grimes et al. ................. 345/810
2007/0070890 A1   3/2007 Rojahn
(Continued)

FOREIGN PATENT DOCUMENTS

CN       1937629 A       3/2007
CN     101043397 A       9/2007
(Continued)

OTHER PUBLICATIONS

International Search Report for PCT/CN2011/076154, English translation attached to original, Both completed by the Chinese Patent Office on Sep. 15, 2011, All together 10 pages.
(Continued)

*Primary Examiner* — Nasser Goodarzi
*Assistant Examiner* — Kyu Chae
(74) *Attorney, Agent, or Firm* — Brooks Kushman P.C.

(57) ABSTRACT

A method and an apparatus are disclosed for controlling bandwidth of multiple Set Top Boxes of a single user in an IPTV system. The method includes saving content bandwidth of every media content by the EPG of the IPTV system; when receiving a start-up and log-in request or a request for switching programs of the present Set Top Box operating currently in multiple Set Top Boxes sharing an identical user bandwidth transmitted by the EPG, a Management Platform of the IPTV system sending the remaining user bandwidth corresponding to the present Set Top Box to the EPG; the EPG comparing the remaining user bandwidth with content bandwidth of every media content saved by itself, and generating a program list of media contents whose content bandwidths are less than or equal to the remaining user bandwidth for the present Set Top Box to select and use.

9 Claims, 3 Drawing Sheets

(51) Int. Cl.
*G06F 3/00* (2006.01)
*G06F 13/00* (2006.01)
*H04N 5/445* (2011.01)
*H04N 21/422* (2011.01)
*H04N 21/262* (2011.01)
*H04N 21/6373* (2011.01)
*H04N 21/482* (2011.01)
*H04N 21/24* (2011.01)
*H04N 21/6547* (2011.01)
*H04N 21/454* (2011.01)
*H04L 29/06* (2006.01)
*H04N 21/258* (2011.01)
*H04N 21/472* (2011.01)

(52) U.S. Cl.
CPC ............ *H04L65/4076* (2013.01); *H04L 65/80* (2013.01); *H04N 21/482* (2013.01); *H04N 21/2402* (2013.01); *H04N 21/25875* (2013.01); *H04N 21/47202* (2013.01); *H04N 21/6547* (2013.01); *H04N 21/454* (2013.01)

(56) References Cited

U.S. PATENT DOCUMENTS

| 2007/0113246 | A1* | 5/2007 | Xiong | 725/39 |
| 2008/0065991 | A1 | 3/2008 | Grimes et al. | |
| 2009/0006626 | A1* | 1/2009 | Yamagishi | 709/226 |
| 2009/0060028 | A1 | 3/2009 | Liu et al. | |
| 2009/0094654 | A1 | 4/2009 | Sullivan et al. | |
| 2012/0259950 | A1* | 10/2012 | Havekes et al. | 709/217 |

FOREIGN PATENT DOCUMENTS

| CN | 101938634 A | 1/2011 |
| EP | 1959620 | 8/2008 |
| WO | 2008066449 A1 | 6/2008 |
| WO | 2009072019 | 6/2009 |

OTHER PUBLICATIONS

Extended European Search Report for PCT/CN2011/076154, Completed by the European Patent Office, Dated Feb. 20, 2014, 11 Pages.

* cited by examiner

METHOD AND DEVICE FOR CONTROLLING BANDWIDTH OF SET TOP BOXES IN INTERNET PROTOCOL TELEVISION (IPTV) SYSTEM

CROSS-REFERENCE TO RELATED APPLICATION

This application is the U.S. national phase of PCT Appln. No. PCT/CN2011/076154 filed Jun. 22, 2011 which claims priority to Chinese Application No. 201010283083.1 filed Sep. 16, 2010, the disclosures of which are incorporated in their entirety by reference herein.

TECHNICAL FIELD

The present invention relates to Internet Protocol Television (IPTV) system, and in particular, to a method and an apparatus for controlling bandwidth of Set Top Box in an IPTV system.

BACKGROUND OF THE RELATED ART

As a new application spanning the telecom industry and the broadcasting and television industry, IPTV has a wide market prospect. On one side, the present telecom industry has rapidly entered into a wideband times with the development of people's requirements, wideband has gradually started to blend into various aspects of social life, while IPTV is the best technology blending the video media into telecom services over the existing telecom bandwidth network.

With the popularization of IPTV, in a family, there are generally multiple televisions, that is, multiple Set Top Boxes, to access. Under traditional operation mode, in the case that the original physical bandwidth is not expanded, a new indoors line will be added again, and the remaining bandwidth of the original line will not be utilized effectively, which also objectively increases the cost of users and extremely goes against the expansion of IPTV services.

Based on the above, the present IPTV system faces such a problem: on the basis that the physical bandwidth doesn't need to expand, under the requirement that users require one-user multiple-Set Top Boxes, multiple Set Top Boxes can not access simultaneously on the service layer effectively, which goes against the use of access bandwidth by users, leading to high cost and low efficiency of use.

SUMMARY OF THE INVENTION

The main object of the present invention is to provide a method and an apparatus for controlling the bandwidth of Set Top Boxes in an IPTV system, to perform a bandwidth control on multiple Set Top Boxes sharing an identical user bandwidth so that program contents which can be watched by users are displayed in available user bandwidth range.

To reach the above object, the technical scheme of the present invention is achieved as follows:

A method for controlling the bandwidth of Set Top Boxes in an IPTV system, comprising:

A) Electronic Program Guide Server (EPG) of the IPTV system saving the content bandwidth of every media content;

B) when receiving a start-up and log-in request or a request for switching the program of the present Set Top Box operating currently in multiple Set Top Boxes sharing the identical user bandwidth transmitted by the EPG, a Management Platform of the IPTV system sending the remaining user bandwidth corresponding to the present Set Top Box to the EPG; and C) the EPG comparing the remaining user bandwidth with the content bandwidth of every media content, and generating a program list of media contents whose content bandwidths are less than or equal to the remaining user bandwidth for the present Set Top Box to select and use.

Preferably, the step A) comprises:

the Management Platform distributing the content program information of every media content to the EPG, wherein, the content program information of every media content comprises the content bandwidth of the media contents;

the EPG saving the received content bandwidth into the database of the EPG.

Preferably, the step B) comprises:

when the EPG transmits the log-in request or a request for switching the program of the present Set Top Box to the Management Platform, the Management Platform determining the remaining user bandwidth which can be used for the present Set Top Box according to the bandwidth utilization situation of other Set Top Boxes sharing the identical user bandwidth, and distributing the remaining user bandwidth to the EPG.

Preferably, the step C) comprises:

the present Set Top Box which have logged successfully or switched a program initiating an on-demand request to the EPG; the EPG responding to the on-demand request, comparing the remaining user bandwidth with the content bandwidth of every media content separately, listing the media contents whose content bandwidths are less than or equal to the remaining user bandwidth and generating and sending the program list to the present Set Top Box.

Preferably, the method further comprises the step D) of playing the media contents implemented after the step C), which is:

the present Set Top Box initiating an on-demand request to Streaming media server by selecting in the content program list of the EPG;

the Streaming media server responding to the on-demand request and playing the corresponding program stream to the present Set Top Box;

after receiving the program stream, the present Set Top Box periodically reporting a user code, a Set Top Box ID, a media content ID and a set top box utilized bandwidth for receiving the program stream to the Management Platform of the IPTV system via the EPG.

Preferably, when the Management Platform of the IPTV system doesn't receive the user code, the Set Top Box ID and the content ID reported by the present Set Top Box during a preset period of time, the Management Platform of the IPTV releases the bandwidth utilized by the present Set Top Box, and re-determines the remaining user bandwidth.

Preferably, the method further comprises the step E) of releasing the bandwidth occupied by the Set Top Box implemented after the step D), specifically is:

at the same time of or after initiating a request for completing playing to the Streaming media server, the present Set Top Box initiating a request for releasing the bandwidth occupied by the Set Top Box to the Management Platform of the IPTV via the EPG, accordingly, the Management Platform of the IPTV releasing the bandwidth occupied by the Set Top Box and re-determining the remaining user bandwidth.

An apparatus for controlling a bandwidth of Set Top Boxes in the IPTV system, comprising:

a Electronic Program Guide Server (EPG) for saving the content bandwidth of every media content, receiving and transmitting a start-up and log-in request or a request for switching the program of the present Set Top Box operating currently in multiple Set Top Boxes sharing the identical user bandwidth, and generating a program list of media contents whose content bandwidths are less than or equal to the remaining user bandwidth; and a Management Platform for sending the remaining user bandwidth corresponding to the present Set Top Box to the EPG when receiving the start-up and log-in request or a request for switching the program of the present Set Top Box so that the EPG compares the remaining user bandwidth with the content bandwidth of every media content and generates the program list.

Preferably, the EPG comprises:

a database for saving the content bandwidth of every media content;

a transmitting and receiving module for receiving and transmitting the start-up and log-in request or the request for switching the program of the present Set Top Box, and receiving the remaining user bandwidth corresponding to the present Set Top Box distributed by Management Platform; and a program list generating module for comparing the remaining user bandwidth with the content bandwidth of every media content, and generating a program list of media contents whose content bandwidths are less than or equal to the remaining user bandwidth.

Preferably, the Management Platform comprises:

a user bandwidth saving module for saving an identical user bandwidth shared by multiple Set Top Boxes;

a Set Top Box utilized bandwidth maintaining module for increasing and decreasing the Set Top Box utilized bandwidth of multiple Set Top Boxes sharing the identical user bandwidth according to the received bandwidth utilization information of multiple Set Top Boxes sharing the identical user bandwidth; and a remaining user bandwidth determining module for determining the remaining user bandwidth according to the user bandwidth and the Set Top Box utilized bandwidth when the present Set Top Box starts up and logs in or switches a program.

Compared with the related art, the beneficial effects of the present invention lies in that: in the situation that other Set Top Boxes sharing an identical user bandwidth receive a program stream, by displaying to the present Set Top Box operating currently a program list of media contents whose content bandwidths are less than or equal to the remaining user bandwidth, the present Set Top Box can request the programs which can be watched effectively from the program lists, thus enabling multiple Set Top Boxes to utilize an identical user bandwidth effectively.

BRIEF DESCRIPTION OF DRAWINGS

FIG. 4 is a bandwidth detecting flow diagram when the Set Top Box to be used logs in;

FIG. 5 is a bandwidth detecting flow diagram of bandwidth reporting after the Set Top Box to be used logs in;

FIG. 6 is a bandwidth releasing flow diagram of ending the playing after the Set Top Box to be used logs in.

PREFERRED EMBODIMENTS OF THE PRESENT INVENTION

The preferred embodiments of the present invention will be described in detail in combination with the accompanying drawings hereinafter, and it should be understood that, the preferred embodiments described below are only used to describe and explain the present invention, but not to limit the present invention.

Figures 1, 2:
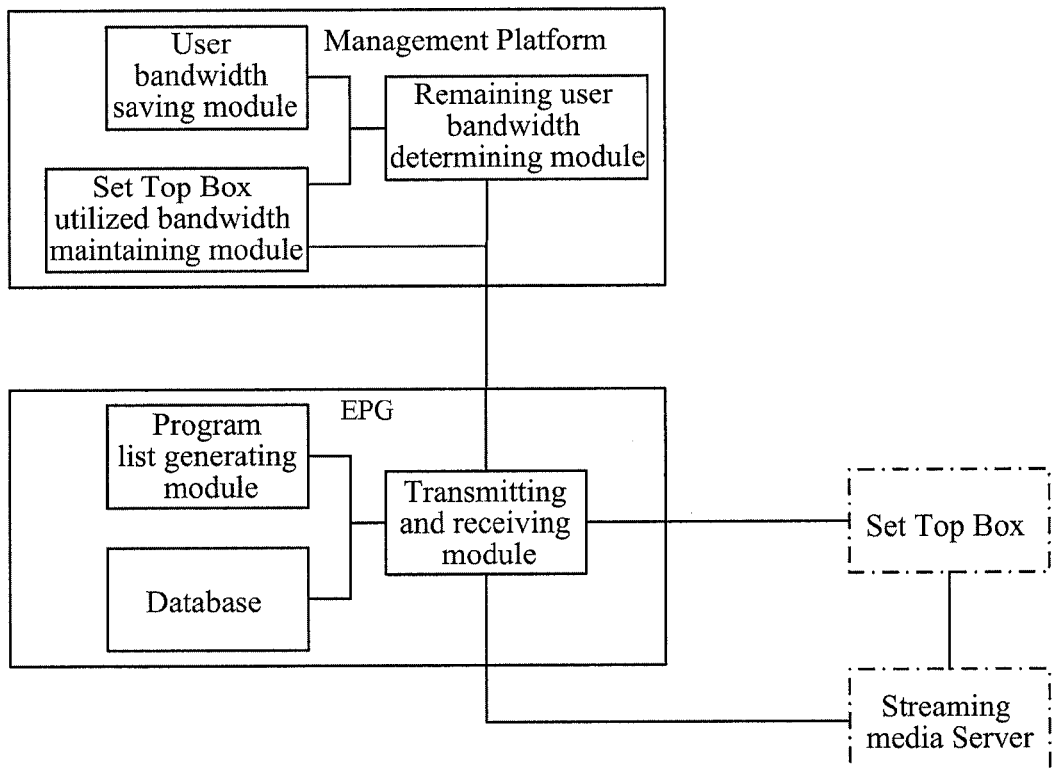
FIG. 1 is a flow diagram of a method for controlling bandwidth of Set Top Boxes in an IPTV system according to the embodiment of the present invention.
FIG. 2 is a structural diagram of an apparatus for controlling bandwidth of Set Top Boxes in an IPTV system according to the embodiment of the present invention.

FIG. 1 illustrates a method for controlling the bandwidth of Set Top Boxes in an IPTV system according to the embodiment of the present invention, as shown in FIG. 1, the method of the present invention comprises the following steps:

A) Electronic Program Guide Server (EPG) of the IPTV system saves the content bandwidth of every media content;

B) when receiving a start-up and log-in request or a request for switching the program of the present Set Top Box operating currently in multiple Set Top Boxes sharing an identical user bandwidth transmitted by the EPG, a Management Platform of the IPTV system sends the remaining user bandwidth corresponding to the present Set Top Box to the EPG;

C) the EPG compares the remaining user bandwidth with content bandwidth of every media content saved by itself, and generates a program list of media contents whose content bandwidths are less than or equal to the remaining user bandwidth for the present Set Top Box to select and use.

Specifically, the above step A) comprises: the Management Platform distributing the content program information of every media content to the EPG, wherein, the content program information of every media content comprises the content bandwidth of the media contents; the EPG saving the content bandwidth into the database of the EPG.

Specifically, the above step B) comprises: when the EPG transmits the log-in request or the request for switching the program of the present Set Top Box to the Management Platform, the Management Platform determining the remaining user bandwidth which can be used by the present Set Top Box according to the bandwidth utilization situation of other Set Top Boxes sharing the identical user bandwidth, and sending the remaining user bandwidth to the EPG of the IPTV system.

Specifically, the above step C) comprises: the present Set Top Box which have logged in or switched a program successfully initiating an on-demand request; the EPG responding to the on-demand request, comparing the remaining user bandwidth with the content bandwidth of every media content saved by it separately, listing the media contents whose content bandwidths are less than or equal to the remaining user bandwidth and generating and sending the program list to the present Set Top Box.

The method of the present invention also comprises a step D) of playing the media contents implemented after the step C), specifically:

the present Set Top Box initiating an on-demand request to Streaming media server by selecting in the content program list of the EPG;

the Streaming media server responding to the on-demand request and playing corresponding program stream to the present Set Top Box;

after receiving the program stream, the present Set Top Box periodically reporting a user code, a Set Top Box ID, a media content ID and set top box utilized bandwidth when receiving the program stream to the Management Platform of the IPTV system via the EPG.

Preferably, when the Management Platform of the IPTV system doesn't receive the user code, the Set Top Box ID and the content ID reported by the present Set Top Box during a preset period of time, the Management Platform of the IPTV releases the bandwidth used by the present Set Top Box, and re-determines the remaining user bandwidth.

The method of the present invention also comprises a step E) of releasing the set top box utilized bandwidth implemented after the step D), specifically:

at the same time of or after initiating a request for completing playing to the Streaming media server, the present Set Top Box initiating a request for releasing the set top box utilized bandwidth to the Management Platform of the IPTV via the EPG;

the Management Platform of the IPTV accordingly releasing the set top box utilized bandwidth and re-determining the remaining user bandwidth.

FIG. 2 illustrates an apparatus for controlling the bandwidth of the Set Top Boxes in the IPTV system, comprising:

a Electronic Program Guide Server (EPG) for saving the content bandwidth of every media content, receiving and transmitting a start-up and log-in request or a request for switching the program of the present Set Top Box operating currently in multiple Set Top Boxes sharing an identical user bandwidth, and generating a program list of media contents whose content bandwidths are less than or equal to the remaining user bandwidth; and a Management Platform for sending the remaining user bandwidth corresponding to the present Set Top Box to the EPG when receiving the start-up and log-in request or the request for switching the program of the present Set Top Box so that the EPG compares the remaining user bandwidth with the saved content bandwidth of every media content and generates the program list.

Utilizing the log-in request or the request for switching the program initiated by the present Set Top Box, the EPG of the embodiment of the present invention obtains the remaining user bandwidth of the user bandwidth shared by the present Set Top Box from the Management Platform, thus providing for the present Set Top Box a program list in which every program can be watched effectively.

The Set Top Box illustrated in FIG. 2 is one of the multiple Set Top Boxes sharing the identical user bandwidth, indicating the present Set Top Box operating currently, and users can access to the EPG via said Set Top Box, ask for services such as program-on-demand, live broadcast, etc.

The Streaming media server illustrated in FIG. 2 is used to play program stream that users request via the EPG, which is part of the related art and thus will not be described in detail.

Besides the above functions, the EPG of the embodiment of the present invention also can show information such as content programs, columns, channels, playback, etc., and can be responsible for responding to the service requests of users such as program-on-demand, live broadcast, etc.

Besides the above functions, the Management Platform of the embodiment of the present invention also can implement functions such as user management, content management, authentication, charging and subscription management, etc.

The EPG illustrated in FIG. 2 can comprise:

a database for saving the content bandwidth of every media content;

a transmitting and receiving module for receiving and transmitting a start-up and log-in request or a request for switching the program of the present Set Top Box, and receiving the remaining user bandwidth corresponding to the present Set Top Box sent by the Management Platform; and a program list generating module for comparing the remaining user bandwidth with the saved content bandwidth of every media content, and generating a program list of media contents whose content bandwidths are less than or equal to the remaining user bandwidth.

The above database also can save other information of the media contents, such as, the name and synopsis information of the media contents, etc.

The Management Platform illustrated in FIG. 2 comprises:

a user bandwidth saving module for saving an identical user bandwidth shared by multiple Set Top Boxes, wherein, the user bandwidth is a fixed value;

a Set Top Box utilized bandwidth maintaining module for increasing and decreasing the Set Top Box utilized bandwidth of multiple Set Top Boxes sharing the identical user bandwidth according to the received bandwidth utilization information of multiple Set Top Boxes sharing the identical user bandwidth; and a remaining user bandwidth determining module for determining the remaining user bandwidth according to the user bandwidth and the Set Top Box utilized bandwidth when the present Set Top Box starts up and logs in or switches a program.

The Set Top Box bandwidth utilization information comprises a user code, a Set Top Box ID and a media content ID, by which the Set Top Box utilized bandwidth maintaining module can obtain the statuses of the bandwidth used by all Set Top Boxes of the user.

Because the Set Top Box utilized bandwidth is actually the sum of the bandwidths for multiple Set Top Boxes receiving program streams of an identical user, once a Set Top Box is added to be used, a Set Top Box utilized bandwidth maintaining module increases the Set Top Box utilized bandwidth; on the contrary, once a Set Top Box is removed, the bandwidth used by the Set Top Box utilized bandwidth maintaining module decreases the Set Top Box utilized bandwidth. Normally, the decrease of the Set Top Box utilized bandwidth is achieved by releasing the Set Top Box utilized bandwidth as mentioned above.

The remaining user bandwidth is inversely proportional to the Set Top Box utilized bandwidth, therefore, when the Set Top Box utilized bandwidth increases, the remaining user bandwidth decreases; on the contrary, when the Set Top Box utilized bandwidth decreases, the remaining user bandwidth increases. Therefore, the Management Platform can adjust the remaining user bandwidth at any time according to the utilization status of the Set Top Boxes of users, thus utilizing the remaining user bandwidth of the identical user bandwidth furthest.

Specific processes of making content program information, detecting the bandwidth for Set Top Box, obtaining a content list according to the remaining user bandwidth, monitoring and maintaining the Set Top Box utilized bandwidth and releasing the Set Top Box utilized bandwidth related to the embodiment of the present invention will be described in detail in combination with FIGS. 3-6 hereinafter.

Figure 3:
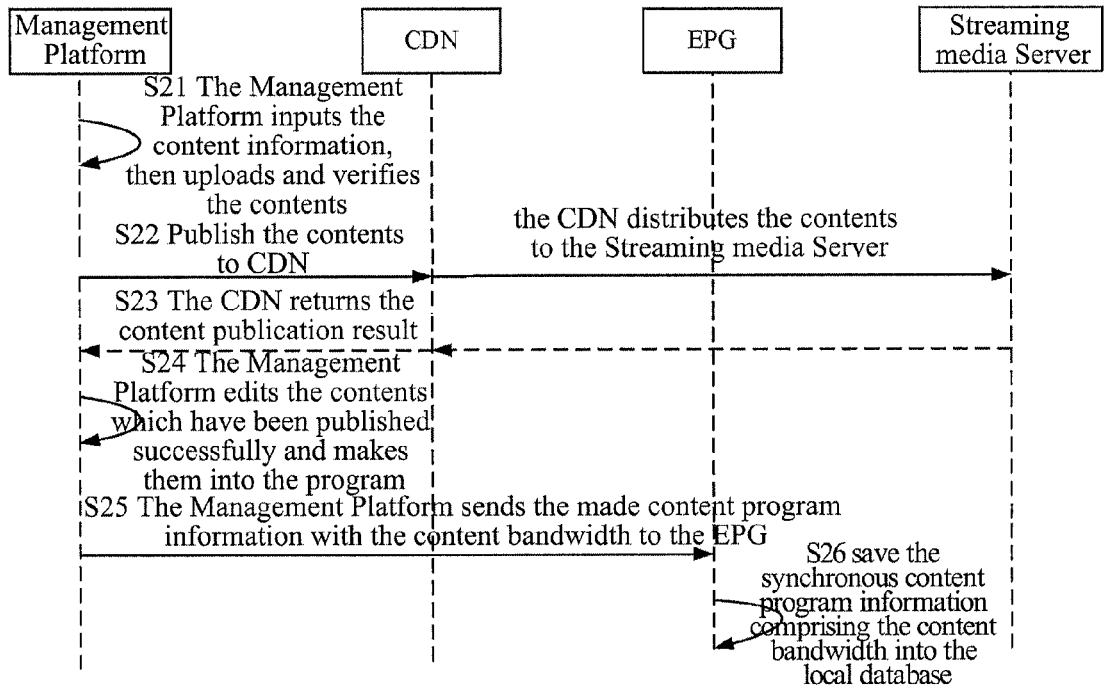
FIG. 3 is a flow diagram of Service Management Platform of IPTV making content program information according to the embodiment of the present invention.

FIG. 3 illustrates the specific flow of the Management Platform making content program information, which involves the above step A) of the embodiment of the present invention, and the flow illustrated in FIG. 3 comprises:

In S21, the Management Platform inputs the content information, comprising metadata information such as the name of contents, directors, actors, content bandwidth, etc., then uploads and verifies the contents after the contents are uploaded successfully.

In S22, after the contents pass the verification, the Management Platform publishes the contents which have passed the verification to a Content Distribution Network System (CDN), and the CDN distributes the contents to the following Streaming media server.

In S23, the CDN returns the content publication result;

In S24, the Management Platform edits the contents which have been published successfully and makes them into programs;

In S25, after the contents are made into programs, the Management Platform sends the content program information to the EPG, wherein, the content program information comprises the content bandwidth;

In S26, the EPG saves the synchronous content program information comprising the content bandwidth into the database of the EPG server locally.

Figure 4:
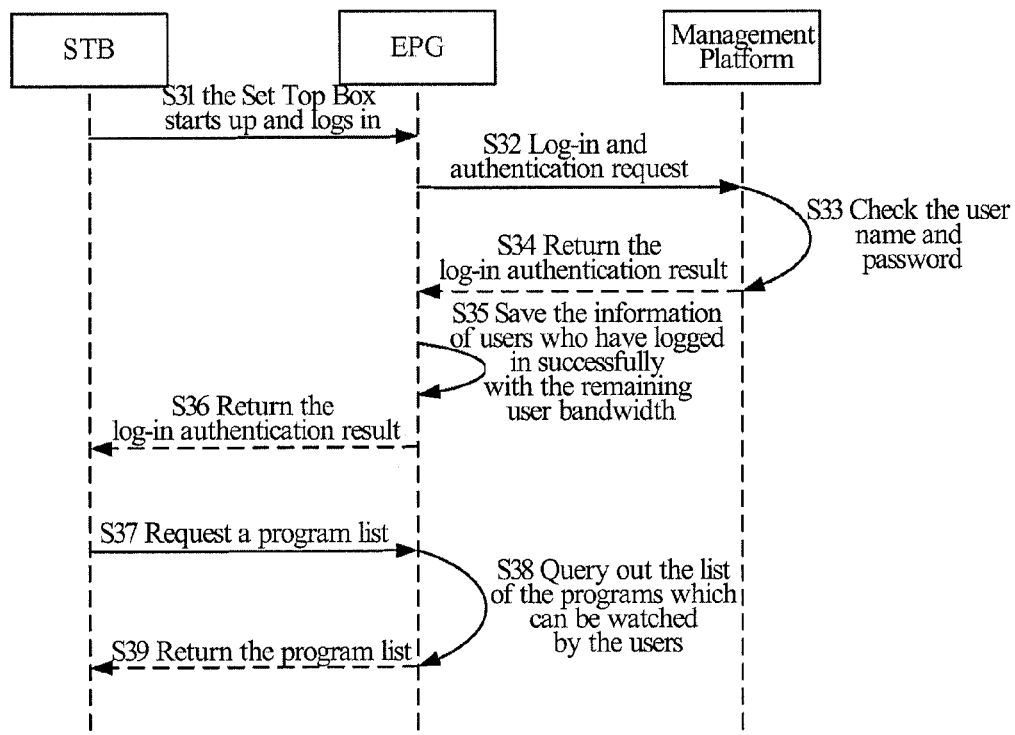

FIG. 4 illustrates the bandwidth detecting flow of the present Set Top Box of multiple Set Top Boxes sharing the identical user bandwidth, which involves the above steps B) and C) of the embodiment of the present invention, the specific flow illustrated in FIG. 4 comprises:

In S31, the Set Top Box starts up and logs in, that is, the log-in is realized by inputting the user name and the password when the Set Top Box starts up.

In S32, the EPG transmits the above Set Top Box log-in and authentication message to the Management Platform, that is, the EPG transmits the user name and password to the Management Platform to check;

In S33, the Management Platform checks the information such as the user name and the password when the Set Top Box logs in; and determines available remaining bandwidth of the users who have logged in successfully;

In S34, the Management Platform returns the Set Top Box log-in and authentication results, if the authentication fails, the user is refused to log in, but if the authentication succeeds, the Management Platform returns to the EPG the user information comprising the remaining user bandwidth information;

In S35, the EPG saves information of the users who have logged in successfully and saves the user information into a database;

In S36, the EPG returns to the Set Top Box the log-in result information, and for the Set Top Boxes which have logged in successfully, the home page of the EPG template can be accessed directly;

In S37, the Set Top Box which has logged in successfully requests a program list with the EPG;

In S38, the EPG compares the present remaining user bandwidth stored in the database with the content bandwidth of every content program information separately, and queries out the list of the programs which can be watched by the users; and In S39, the EPG returns the program list to the Set Top Box.

Figure 5:
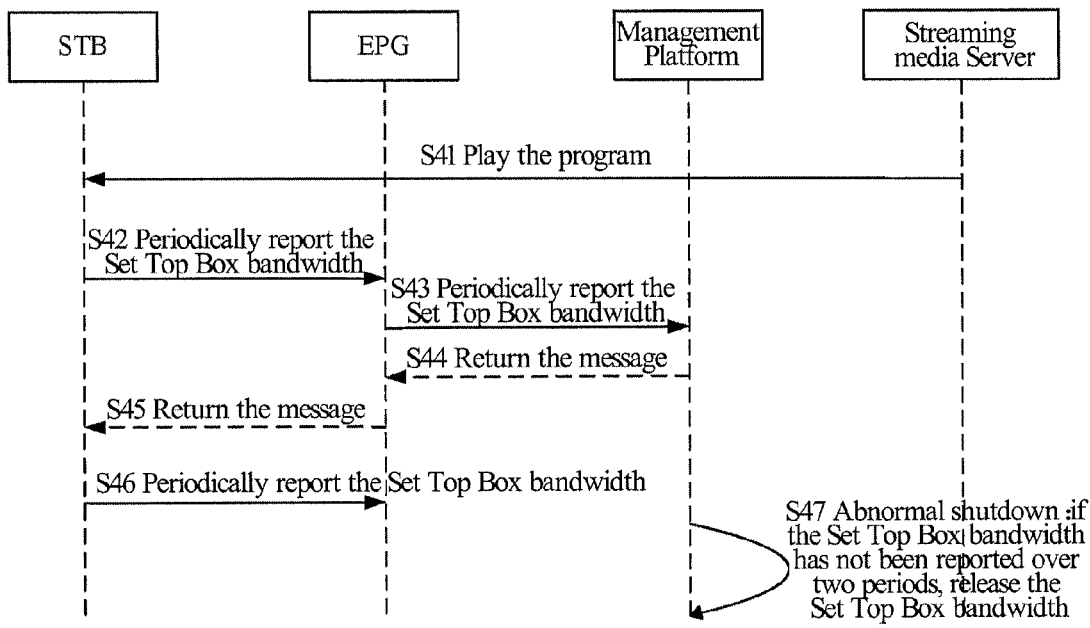

FIG. 5 illustrates the flow of reporting the bandwidth of the Set Top Box, which is used to maintain the Set Top Box utilized bandwidth by the Management Platform. The flow happens while the users are watching programs, at this moment, the Set Top Box periodically reports the user code, the Set Top Box ID and the media content ID, and the Management Platform releases the bandwidth for Set Top Box when the users does not reported over the prescribed period (for example, two periods) if the Set Top Box is shut down abnormally. The flow illustrated in FIG. 5 comprises:

In S41, Streaming media server plays the program stream to the Set Top Box;

In S42, the Set Top Box periodically reports the information such as the user code, the Set Top Box ID and the content ID, etc.;

In S43, EPG reports the information reported by the Set Top Box to the Management Platform;

In S44, the Management Platform saves the information such as the user code, the Set Top Box ID and the content ID, etc. reported by the Set Top Box into a database, then returns processed message to the EPG;

In S45, the EPG returns the message to the Set Top Box;

In S46, the Set Top Box periodically reports the user code, the Set Top Box ID and the content ID again in the next period, and the process is repeated circularly; and In S47, when the Set Top Box is shut down abnormally, and the Management Platform detects that the Set Top Box does not reported the information such as the user code, the Set Top Box ID and the content ID, etc. over two periods, the Management Platform releases the bandwidth of the Set Top Box.

Figure 6:
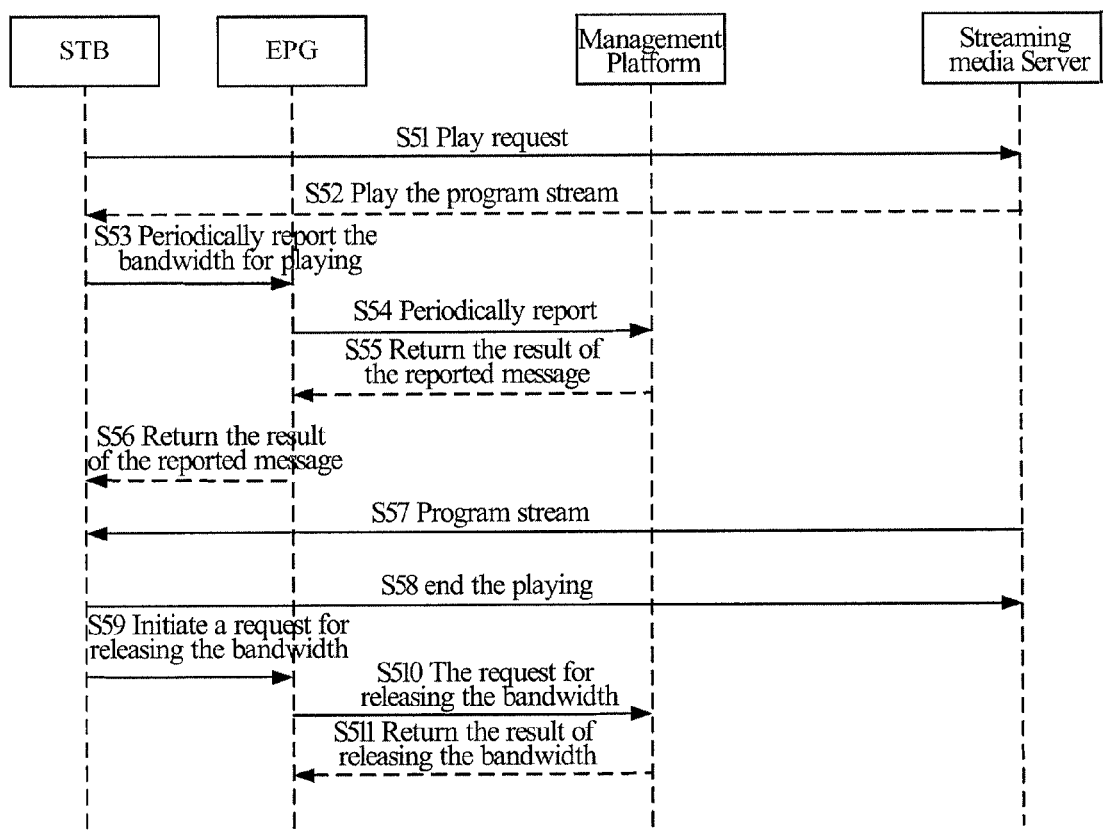

FIG. 6 illustrates the flow of the Set Top Box releasing the bandwidth, which is used to release the Set Top Box utilized bandwidth when the Set Top Box is shut down. The flow illustrated in FIG. 6 comprises:

In S51, Set Top Box initiates a play request to Streaming media server;

In S52, the Streaming media server plays the program stream;

In S53, the Set Top Box periodically reports the bandwidth for playing (that is, the Set Top Box utilized bandwidth);

In S54, the EPG transmits the information of the bandwidth for playing reported by the Set Top Box to the Management Platform;

In S55, the Management Platform stores the information of the bandwidth for playing reported periodically, and returns the result of the reported message to the EPG;

In S56, the EPG returns the result of the reported message to the Set Top Box, and the process is repeated circularly;

In S57, the Streaming media server keeps on playing the program stream;

In S58, the Set Top Box initiates the request for ending the playing to the Streaming media server;

In S59, the Set Top Box initiates the request for releasing the bandwidth to the EPG;

In S510, the EPG transmits the request for releasing the bandwidth thereof to the Management Platform; and In S511, after dealing with the request for releasing the bandwidth, the Management Platform transmits the result of releasing the bandwidth to the EPG.

The above methods of the present invention is also applied for the situation that there are multiple Set Top Box under multiple accounts using the total bandwidth.

In summary, in the present invention, the program list of media contents which can be watched effectively by users is obtained according to the remaining user bandwidth, that is, the media contents with different resolutions such as standard definition and high definition etc. are displayed to the users according to the differences of the remaining user bandwidths, which promotes the user experience, thus achieving fine services for users and providing a foundation for subsequent flexible charge mode.

Though the present invention has been described in detail above, the present invention is not limited to this, those skilled in the art can make all kinds of modifications according to principle of the present invention. Therefore, all modifications made according to the present invention should be considered as falling into the protection scope of the present invention.

INDUSTRIAL APPLICABILITY

In present invention, the list of media content programs which can be watched effectively by users is obtained according to the remaining user bandwidth, that is, the media contents with different resolutions such as standard definition and high definition etc. are displayed to the users according to the differences of the remaining user bandwidths, which promotes the user experience, thus achieving fine services for users and providing a foundation for subsequent flexible charge mode.

What is claimed is:

1. A method for controlling bandwidths of Set Top Boxes in an IPTV system, comprising:
    A) saving a content bandwidth of every media content in an Electronic Program Guide Server (EPG) of the IPTV system;
    B) sending a remaining user bandwidth corresponding to the present Set Top Box to the EPG by a Management Platform of the IPTV system when the Management Platform of the IPTV system receiving a start-up and log-in request or a request for switching a program of a present Set Top Box operating currently in multiple Set Top Boxes sharing an identical user bandwidth transmitted by the EPG;
    C) comparing the remaining user bandwidth with content bandwidth of every media content, and generating a program list of media contents whose content bandwidths are less than or equal to the remaining user bandwidth for the present Set Top Box to select and use by the EPG;
    D) initiating an on-demand request to a Streaming media server by selecting in a content program list of the EPG by the present Set Top Box;
    responding to the on-demand request and playing a corresponding program stream to the present Set Top Box by the Streaming media server;
    periodically reporting a user code, a Set Top Box ID, a media content ID and a bandwidth utilized by the Set Top Box for receiving the program stream to the Management Platform of the IPTV system via the EPG by the present Set Top Box after receiving the program stream; and
    E) at same time of or after initiating a request for completing playing to the Streaming media server, initiating a request for releasing the bandwidth utilized by the Set Top Box to the Management Platform of the IPTV via the EPG by the present Set Top Box, accordingly, releasing the bandwidth utilized by the Set Top Box and re-determining a remaining user bandwidth by the Management Platform of the IPTV.

2. The method according to claim 1, wherein, the step A) comprises:
    distributing content program information of every media content to the EPG by the Management Platform, wherein, the content program information of every media content comprises the content bandwidth of the media content;
    saving the content bandwidth into a database of the EPG.

3. The method according to claim 1, wherein, the step B) comprises:
    determining the remaining user bandwidth available for the present Set Top Box according to a bandwidth utilization situation of other Set Top Boxes sharing the identical user bandwidth, and sending the remaining user bandwidth to the EPG by the Management Platform when the EPG transmits a log-in request or a request for switching a program of the present Set Top Box to the Management Platform.

4. The method according to claim 1, wherein, the step C) comprises:
    initiating an on-demand request to the EPG by the present Set Top Box when the present Set Top Box has logged in successfully or switched a program;
    responding to the on-demand request, comparing the remaining user bandwidth with the content bandwidth of every media content separately, listing the media contents whose content bandwidths are less than or equal to the remaining user bandwidth and generating and sending the program list to the present Set Top Box by the EPG.

5. The method according to claim 1, wherein, when the Management Platform of the IPTV system doesn't receive the user code, the Set Top Box ID and the content ID reported by the present Set Top Box during a preset period of time, the Management Platform of the IPTV releases the bandwidth utilized by the present Set Top Box, and re-determines a remaining user bandwidth.

6. An apparatus for controlling bandwidths of Set Top Boxes in an IPTV system, comprising:
    a Electronic Program Guide Server (EPG), for saving a content bandwidth of every media content, receiving and transmitting a start-up and log-in request or a request for switching a program of a present Set Top Box operating currently in multiple Set Top Boxes sharing an identical user bandwidth, and generating a program list of media contents whose content bandwidths are less than or equal to a remaining user bandwidth; and
    a Management Platform, for sending a remaining user bandwidth corresponding to the present Set Top Box to the EPG when receiving a start-up and log-in request or a request for switching a program of the present Set Top Box so that the EPG compares the remaining user bandwidth with the content bandwidth of every media content and generating the program list;
    the present Set Top Box, for initiating an on-demand request to a Streaming media server by selecting in a content program list of the EPG;
    receiving a corresponding program stream playing by the Streaming media server in response to the on-demand request;
    periodically reporting a user code, a Set Top Box ID, a media content ID and a bandwidth utilized by the Set Top Box for receiving the program stream to the Management Platform of the IPTV system via the EPG after receiving the program stream; and
    at same time of or after initiating a request for completing playing to the Streaming media server, initiating a request for releasing the bandwidth utilized by the Set Top Box to the Management Platform of the IPTV via the EPG.

7. The apparatus according to claim 6, wherein, the EPG comprises: a database, for saving the content bandwidth of every media content;
    a transmitting and receiving module, for receiving and transmitting the start-up and log-in request or the request for switching a program of the present Set Top Box, and receiving the remaining user bandwidth corresponding to the present Set Top Box sent by the Management Platform; and
    a program list generating module, for comparing the remaining user bandwidth with the content bandwidth of every media content, and generating a program list of media contents whose content bandwidths are less than or equal to the remaining user bandwidth.

8. The apparatus according to claim 6, wherein, the Management Platform comprises:
- a user bandwidth saving module, for saving an identical user bandwidth shared by multiple Set Top Boxes;
- a Set Top Box utilized bandwidth maintaining module for increasing and decreasing the Set Top Box utilized bandwidth of multiple Set Top Boxes sharing the identical user bandwidth according to received bandwidth utilization information of multiple Set Top Boxes sharing the identical user bandwidth; and a remaining user bandwidth determining module, for determining a remaining user bandwidth according to the user bandwidth and the Set Top Box utilized bandwidth when the present Set Top Box starts up and logs in or switches a program.

9. The apparatus according to claim 7, wherein, the Management Platform comprises:
- a user bandwidth saving module, for saving an identical user bandwidth shared by multiple Set Top Boxes;
- a Set Top Box utilized bandwidth maintaining module for increasing and decreasing the Set Top Box utilized bandwidth of multiple Set Top Boxes sharing the identical user bandwidth according to received bandwidth utilization information of multiple Set Top Boxes sharing the identical user bandwidth; and a remaining user bandwidth determining module, for determining a remaining user bandwidth according to the user bandwidth and the Set Top Box utilized bandwidth when the present Set Top Box starts up and logs in or switches a program.

\* \* \* \* \*